(12) United States Patent
Hagiwara

(10) Patent No.: US 6,490,921 B2
(45) Date of Patent: Dec. 10, 2002

(54) OSCILLATING LIQUID LEVEL MEASURING APPARATUS

(75) Inventor: Yoshihiro Hagiwara, Kashiwazaki (JP)

(73) Assignee: Fuji Xerox Co., Ltd. (JP)

( * ) Notice: Subject to any disclaimer, the term of this patent is extended or adjusted under 35 U.S.C. 154(b) by 33 days.

(21) Appl. No.: 09/736,623

(22) Filed: Dec. 14, 2000

(65) Prior Publication Data

US 2002/0124647 A1 Sep. 12, 2002

(30) Foreign Application Priority Data

Dec. 15, 1999 (JP) .......................................... 11-355981

(51) Int. Cl.[7] .......................... G01F 23/56; G01F 23/36; G01F 23/30; G01F 23/00
(52) U.S. Cl. ............................. 73/305; 73/313; 73/314; 73/290
(58) Field of Search ....................... 73/305, 314, 313, 73/290 V; 137/398

(56) References Cited

U.S. PATENT DOCUMENTS

| | | | |
|---|---|---|---|
| 4,215,574 A | * | 8/1980 | Godeux ........................ 73/314 |
| 4,536,660 A | * | 8/1985 | Tetro ........................... 307/118 |
| 4,803,427 A | * | 2/1989 | Mason et al. ................ 324/207 |
| 4,839,590 A | * | 6/1989 | Koski et al. ................. 324/208 |
| 4,939,457 A | * | 7/1990 | Tellerman ............... 324/207.13 |

FOREIGN PATENT DOCUMENTS

| | | |
|---|---|---|
| JP | 6367545 | 3/1988 |
| JP | 669276 | 9/1994 |
| JP | 11030544 | 2/1999 |
| JP | 11153471 | 6/1999 |

* cited by examiner

*Primary Examiner*—Hezron Williams
*Assistant Examiner*—Katina Wilson
(74) *Attorney, Agent, or Firm*—Dickstein, Shapiro, Morin & Oshinsky, LLP.

(57) ABSTRACT

The present invention provides an oscillating liquid level measuring apparatus includes a liquid level measuring unit 10 having: a floating member 3 floating on a surface of liquid 1 in a tank 2; a variable resistor 4 arranged o the top of the tank 2 for measuring a perpendicular displacement of the floating member 3; a transmitting member 5 extending from the floating member 3 and through the top of the tank 2 for transmitting the perpendicular displacement of the floating member 3 to the variable resistor 4; and holders 6 arranged to sandwich the transmitting members 5 for restricting the movement of the floating member 3 only in the perpendicular direction. A connection portion between the transmitting member 5 and the variable resistor 4 has a predetermined allowance 9 in the displacement direction 8 of the floating member 3.

14 Claims, 5 Drawing Sheets

OSCILLATING LIQUID LEVEL MEASURING APPARATUS

BACKGROUND OF THE INVENTION

1. Field of the Invention

The present invention relates to a liquid level measuring apparatus and in particular, to a liquid level measuring apparatus for measuring liquid level displacements by using fine oscillations.

2. Description of the Related Art

Various liquid level measuring apparatuses have been suggested. For example, Japanese Utility Model 6-69276 discloses a liquid level measuring apparatus for optically measuring a liquid level. Moreover, Japanese Patent Publication 11-30544 discloses a capacitance-type liquid level measuring apparatus capable of measuring a liquid level in a tank continuously and in real time. Furthermore, Japanese Patent Publication 11-153471 discloses a liquid information measuring apparatus.

Utilizing a single acoustic wave oscillator to measure a liquid level as well as an acoustic wave propagation time.

Moreover, Japanese Patent Publication 63-67545 discloses a specific gravity measuring apparatus shown in FIG. 7. Referring to FIG. 7, in this specific gravity measuring apparatus, when the specific gravity of liquid 103 is changed, the buoyancy functioning on a floating member 102 and a reference member 111 is changed. This displaces the floating member 102 in relation to the reference member 111. That is a specific gravity change is converted into a vertical displacement of the floating member 102. This displacement is detected by a differential transformer 114 and an electric signal corresponding to the displacement is output. This electric signal is used to determine the specific gravity of the liquid 103. This specific gravity measuring apparatus can be applied to an oscillating liquid level measuring apparatus.

Since the liquid level measuring apparatus using the floating member and the differential transformer is costly, there has been developed a liquid level measuring apparatus using a contact-type variable resistor instead of the differential transformer.

However, the contact-type variable resistor has a problem in that the contact surface is worn away by repeated slide motion and the variable resistor cannot maintain linearity. In general, it is said to have a service life of 100,000 to 1,000,000 cycles. However, there is a problem in that when an oscillating liquid level is measured continuously, the variable resistor repeats sliding motion locally and that portion alone experiences extreme local wearing.

The conventional liquid level measuring apparatus uses a number of parts, each of which is expensive, increasing the total cost.

Moreover, in the case of the liquid level measuring apparatus using the contact-type variable resistor, its service life is shortened when the liquid level to be measured is oscillating. This is because while the liquid level is oscillating, the variable resistor repeats sliding motion at a particular location, which is easily worn away.

SUMMARY OF THE INVENTION

It is therefore an object of the present invention to provide an oscillating liquid level measuring apparatus having a long service life at a reasonable cost.

The oscillating liquid level measuring apparatus according to the present invention comprises a liquid level measuring unit for measuring a displacement of a floating member floating on a liquid surface while ignoring displacement changes not greater than a predetermined amplitude.

Moreover, the liquid level measuring unit includes: a floating member having a specific gravity smaller than that of the liquid and floating on a surface of liquid in a tank; a displacement amount measuring unit arranged on the top of the tank for measuring a perpendicular displacement of the floating member; a transmitting member extending from the floating member through the top of the tank for transmitting the perpendicular displacement of the floating member to the displacement amount measuring unit; and holders arranged to sandwich the transmitting members for restricting the movement of the floating member only in the perpendicular direction, wherein a connection portion between the transmitting member and the displacement amount measuring unit has a predetermined allowance in the displacement direction of the floating member.

Furthermore, the predetermined allowance may be equal to the predetermined amplitude to be ignored.

Furthermore, the displacement amount measuring unit may be composed of a variable resistor.

Furthermore, the displacement amount measuring unit may be composed of an encoder.

Another aspect of the present invention provides a liquid developing apparatus using the liquid level measuring apparatus according to the present invention.

DESCRIPTION OF THE PREFERRED EMBODIMENTS

Description will now be directed to an embodiment of the present invention with reference to the attached drawings.

Figure 1:
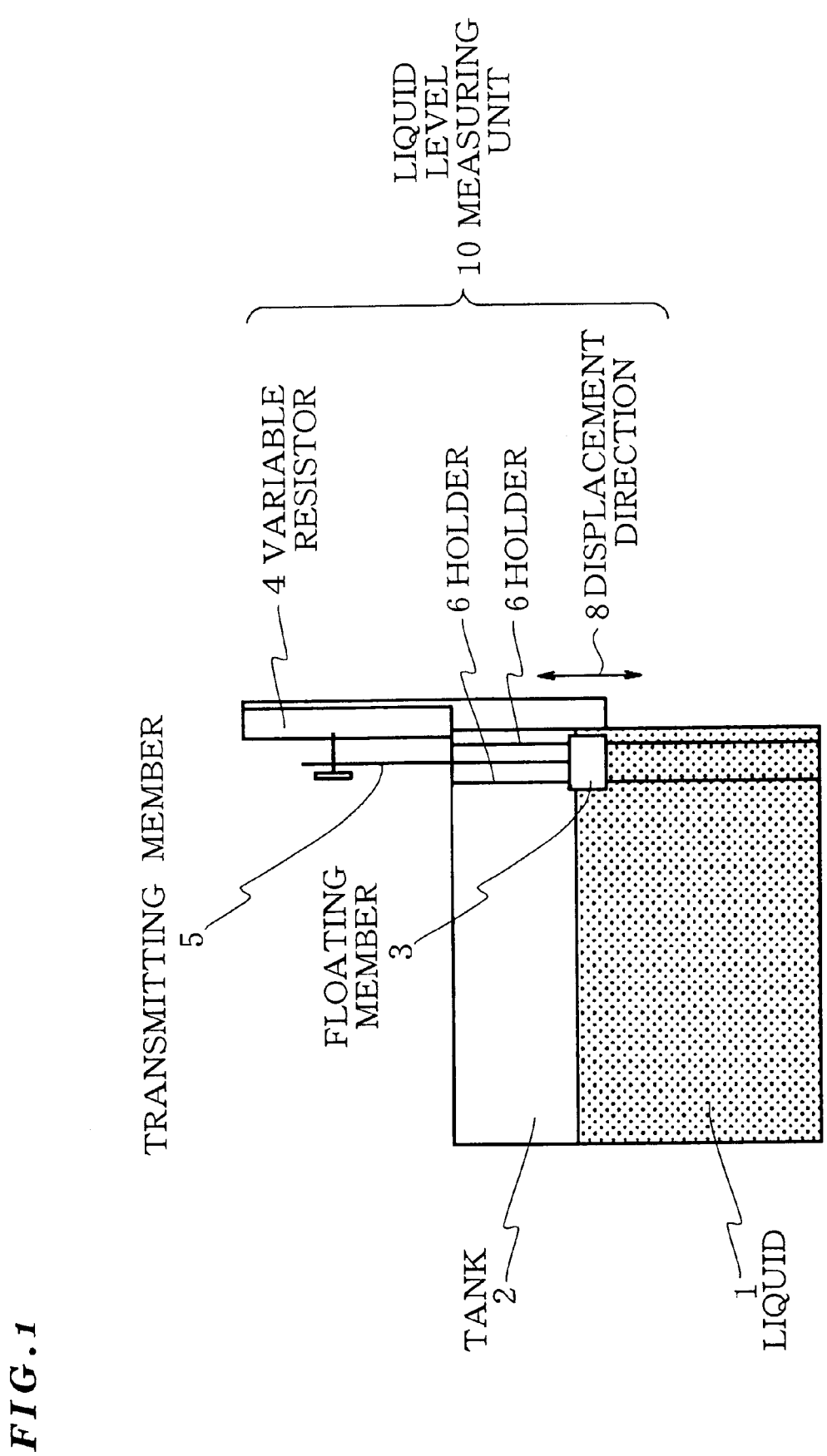
FIG. 1 shows a configuration of an embodiment of the present invention.
Figure 2:
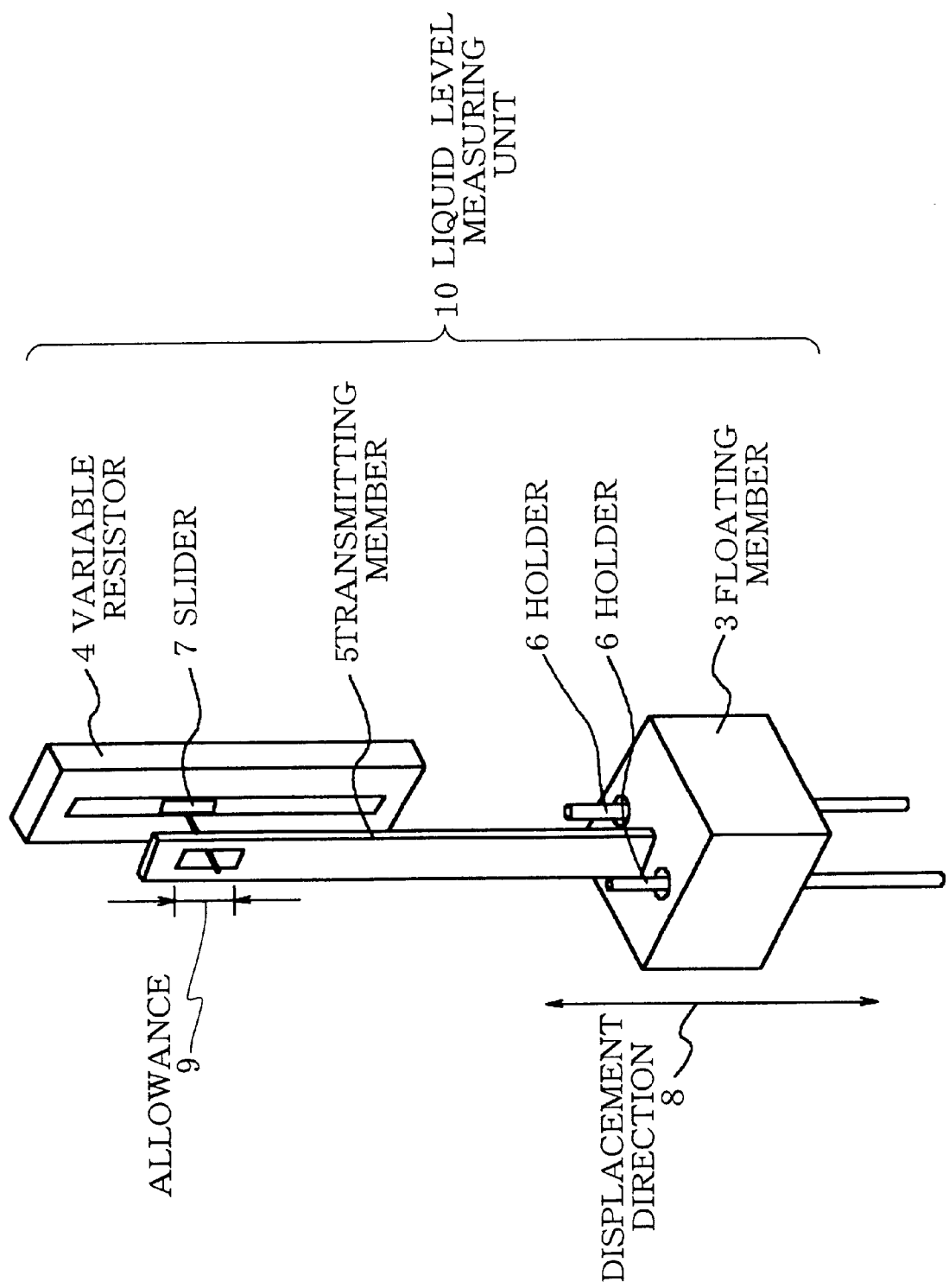
FIG. 2 shows a detailed configuration of a liquid level measuring unit of this embodiment.

FIG. 1 shows a configuration of an oscillating liquid level measuring apparatus according to the embodiment of the present invention and FIG. 2 shows a detailed configuration of a part of FIG. 1. The oscillating liquid level measuring apparatus includes a liquid level measuring unit 10 for measuring a displacement of a floating member 3 floating on the surface of a liquid 1 while ignoring a displacement not greater than a predetermined amplitude.

More specifically, this oscillating liquid level measuring apparatus according to this embodiment includes: a tank 2 containing a liquid 1; a floating member 3 made from material having a specific gravity smaller than that of the liquid 1 in the tank 2; a displacement measuring unit composed from a variable resistor 4 arranged on the top of the tank 2 for measuring a perpendicular displacement; a transmitting member 5 standing in the perpendicular direction through the top of the tank 2 and connected to the floating member 3 for transmitting a vertical displacement amount of the floating member 3 to the variable resistor 4; and holders 6 arranged to sandwich the transmitting member 5 so as to restrict t he movement of the floating member 3 to the perpendicular direction and prevent a horizontal movement.

A vertical movement of the floating member 3 is interlocked with a movement of the transmitting member 5 and is transmitted to the variable resistor 4. The variable resistor 4 has a slider 7 which is interlocked with the movement of the floating member 3, changing the resistance value in analog. This enables to externally measure an electric resistance to determine the current position of the floating member 3 so as to estimate the liquid level. Here, the connection portion between the transmitting member 5 and the variable resistor 4 has a predetermined allowance 9 in the displacement direction 8 of the floating member 3. The allowance 9 corresponds to a liquid level displace amount not greater than a predetermined amplitude to be ignored.

Figure 3:
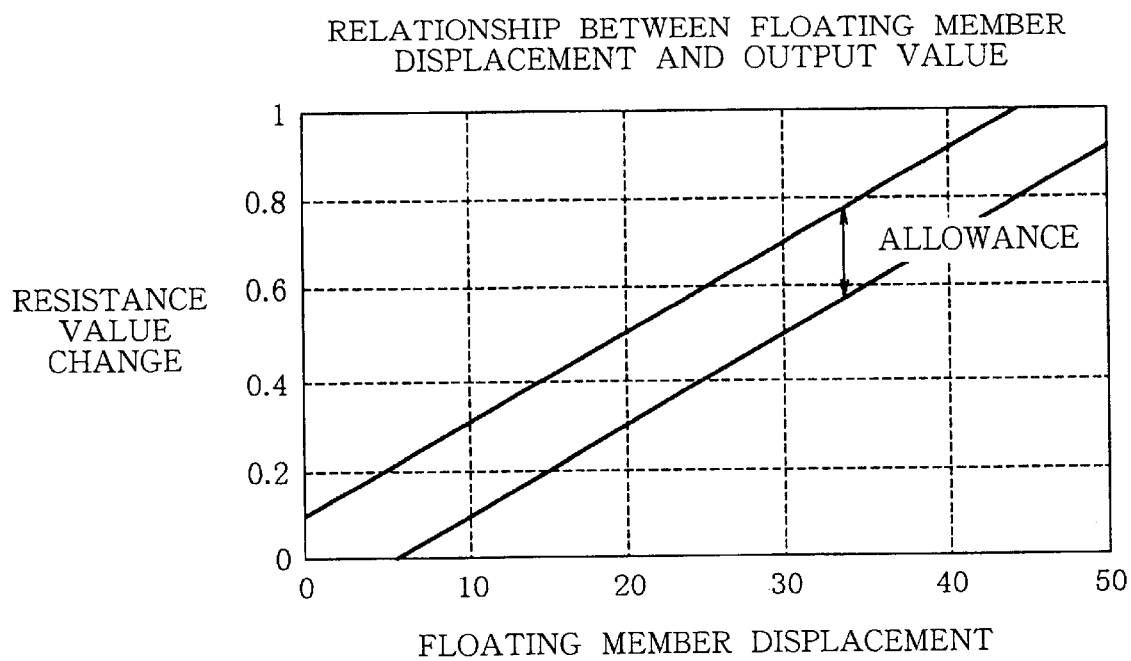
FIG. 3 shows an example of the relationship between the liquid level (floating member) displacement and the level measuring apparatus output value.
Figure 4:
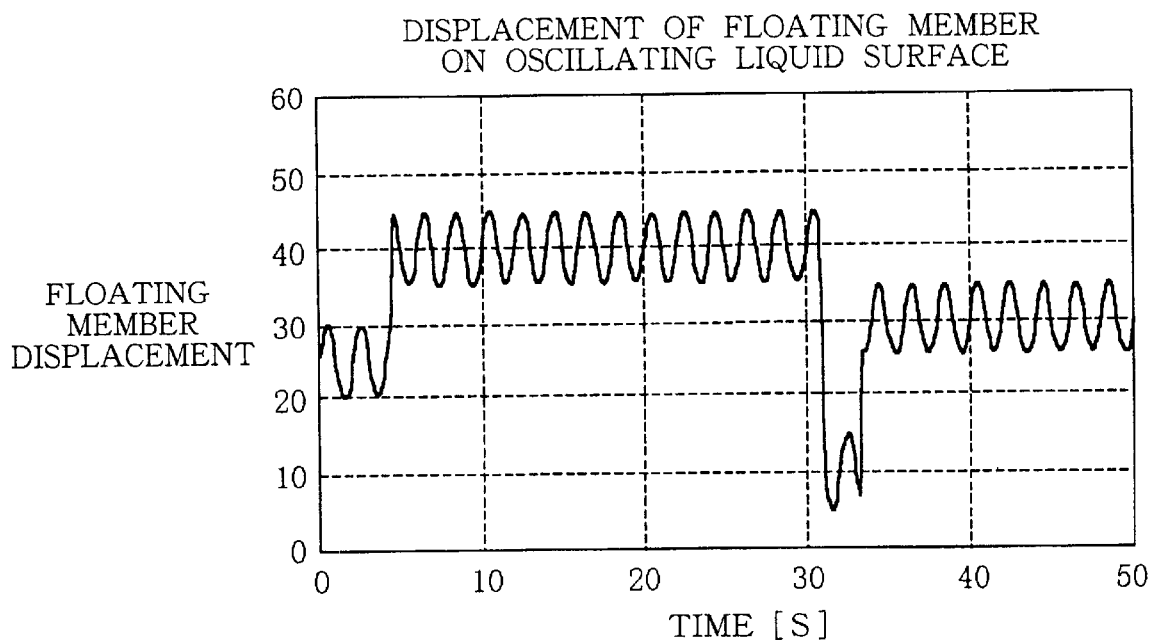
FIG. 4 shows the floating member displacement amount when the liquid level is displaced with a fine oscillation.
Figure 5:
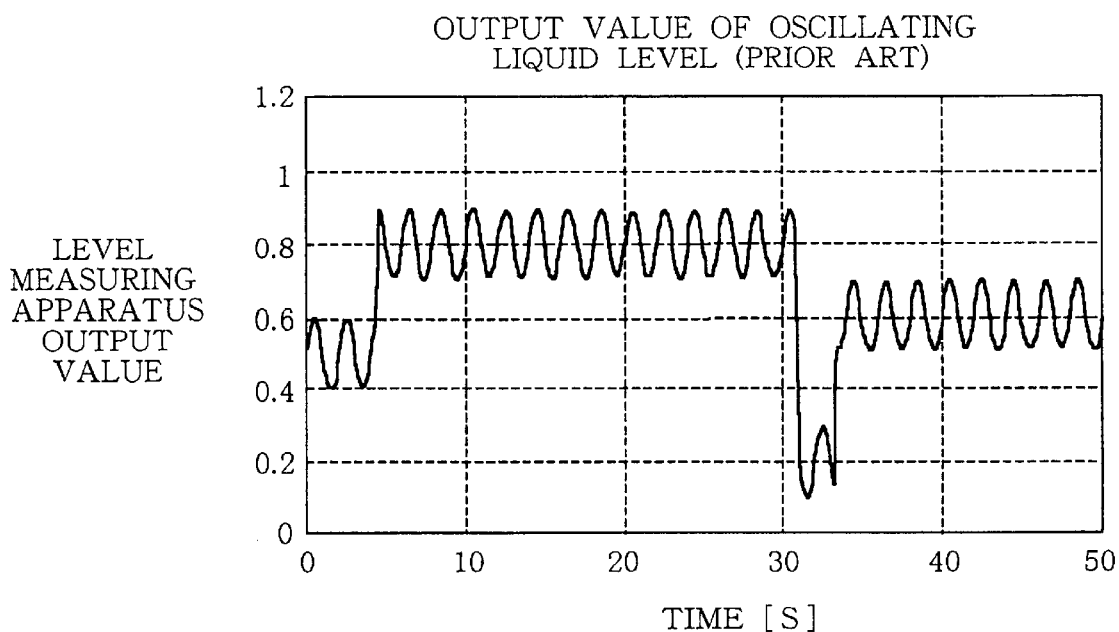
FIG. 5 shows an example of output values obtained by a conventional level measuring apparatus having no allowance when measuring a liquid surface displacing with a fine oscillation.
Figure 6:
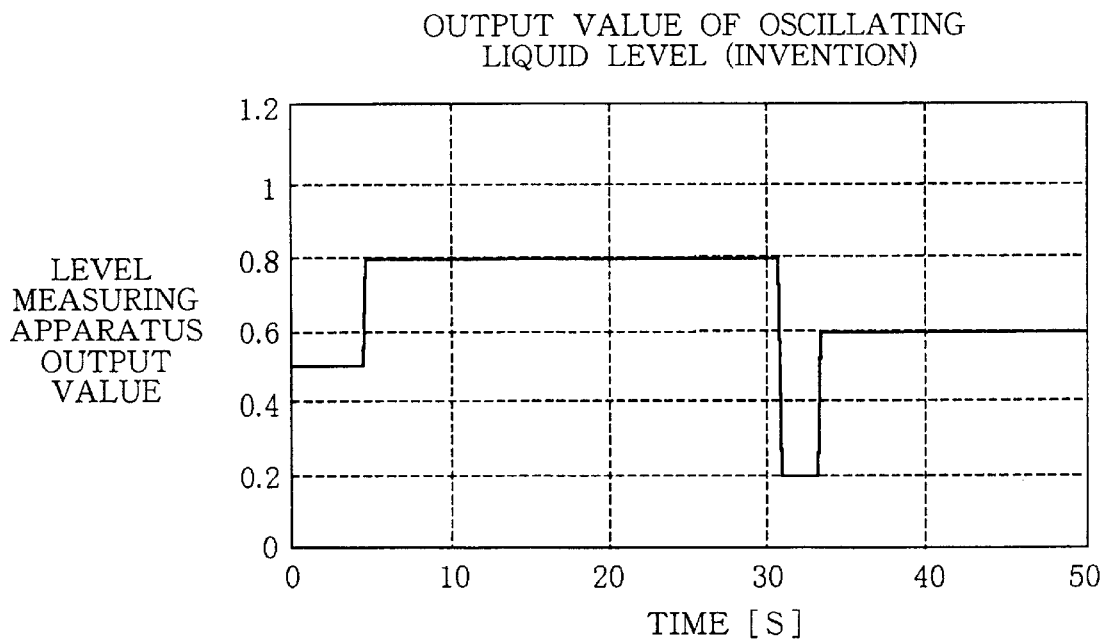
FIG. 6 shows an example of output values obtained by the level measuring apparatus of the present embodiment when measuring a liquid surface displacing with a fine oscillation.
Figure 7:
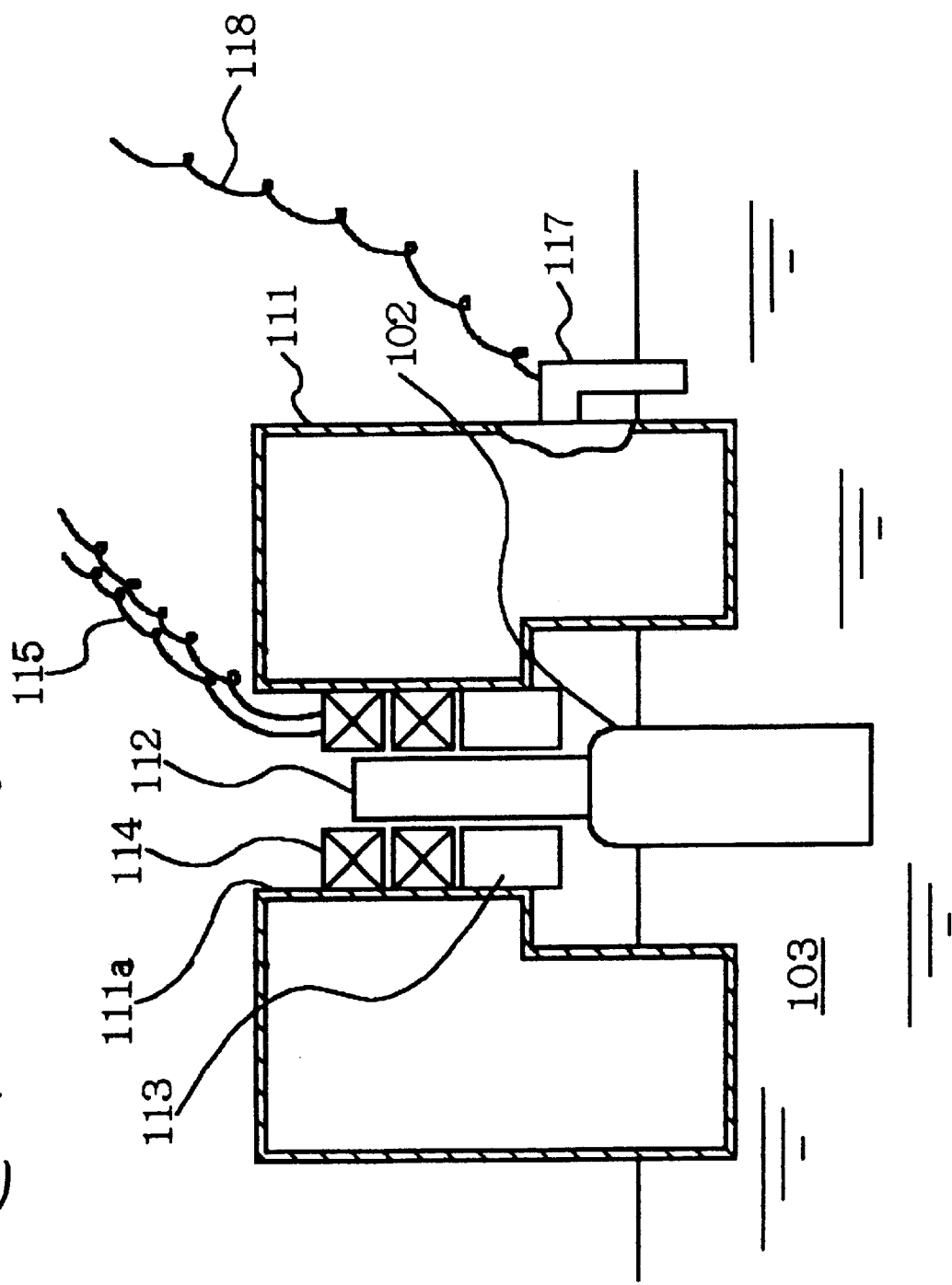
FIG. 7 shows a configuration of a conventional example.

Explanation will now be given on the operation of this embodiment with reference to FIG. 3 to FIG. 6 together with FIG. 1 and FIG. 2. A vertical movement of the floating member 3 floating on the liquid surface is transmitted to the slide-type variable resistor 4 by the transmitting member 5 extending from the floating member 3 in the perpendicular direction. FIG. 3 shows the relationship between the displacement amount of the floating member 3 and the resistance value of the variable resistor 4. Here, the resistance value has an irregularity corresponding to the allowance 9 of the transmitting member 5, which results in a roughness of the measuring accuracy. This will be a disadvantage when measuring a still liquid level. However, this will be an advantage when measuring a displacement of an oscillating liquid level assumed in this invention. For example, when the liquid level displaces along the time axis as shown in FIG. 4, a level measuring apparatus having no allowance 9 would output values as shown in FIG. 5. This means that the slider 7 of the variable resistor 4 repeats the sliding movement the number of times equal to the number of oscillations. As compared to this, the present embodiment output values as shown in FIG. 6 ignoring the fine oscillation of the liquid level and accordingly does not require useless movement of the slider 7 of the variable resistor 4.

Thus, in the present embodiment, the slider 7 of the variable resistor 4 need not repeat useless movement, which prevents useless sliding movements resulting in a linearity change of the resistance value.

While the aforementioned embodiment utilizes the variable resistor 4 as the displacement measuring unit, it is also possible to use an encoder instead of the variable resistor. The variable resistor outputs analog values while the encoder outputs digital values.

As has been described above, the present invention has an effect that the production cost is reasonable. This is because the number of components is small and they are available at reasonable costs.

The present invention has another effect that the apparatus can have a long service life. This is because the present invention prevents an excessive use of a particular part of the displacement measuring unit such as a variable resistor due to the liquid level oscillation normally present, and can prevent performance lowering due to abrasion.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-355981 (Filed on Dec. 15$^{th}$, 1999) including specification, claims, drawings and summary are incorporated herein by reference in its entirety.

What is claimed is:

1. The oscillating liquid level measuring apparatus comprising: a liquid level measuring unit operatively coupled to a floating member and so constructed as to provide a measurement indicative of a distance displacement of the floating member floating on a surface of a liquid, while ignoring certain displacement changes of the floating member that are smaller than a predetermined amplitude.

2. The oscillating liquid level measuring apparatus as claimed in claim 1, wherein the liquid level measuring unit includes: the floating member floating on the surface of the liquid in a tank; a displacement amount measuring unit arranged on the top of the tank for measuring a perpendicular displacement of the floating member; a transmitting member extending from the floating member for transmitting the perpendicular displacement of the floating member to the displacement amount measuring unit; and holders arranged to sandwich the transmitting members for restricting the movement of the floating member only in the perpendicular direction, a connection portion between the transmitting member and the displacement amount measuring unit having a predetermined allowance in the displacement direction of the floating member.

3. The oscillating liquid level measuring apparatus as claimed in claim 2, wherein the predetermined allowance is equal to the predetermined amplitude to be ignored.

4. The oscillating liquid level measuring apparatus as claimed in claim 3, wherein the displacement amount measuring unit is composed of a variable resistor.

5. The oscillating liquid level measuring apparatus as claimed in claim 4, in combination with a liquid developing apparatus including the tank holding the liquid with the floating member disposed in the tank.

6. The oscillating liquid level measuring apparatus as claimed in claim 3, wherein the displacement amount measuring unit is composed of an encoder.

7. The oscillating liquid level measuring apparatus as claimed in claim 6, in combination with a liquid developing apparatus including the tank holding the liquid with the floating member disposed in the tank.

8. The oscillating liquid level measuring apparatus as claimed in claim 3, in combination with a liquid developing apparatus including the tank holding the liquid with the floating member disposed in the tank.

9. The oscillating liquid level measuring apparatus as claimed in claim 2, wherein the displacement amount measuring unit is composed of a variable resistor.

10. The oscillating liquid level measuring apparatus as claimed in claim 9, in combination with a liquid developing apparatus including the tank holding the liquid with the floating member disposed in the tank.

11. The oscillating liquid level measuring apparatus as claimed in claim 2, wherein the displacement amount measuring unit is composed of an encoder.

12. The oscillating liquid level measuring apparatus as claimed in claim 11, in combination with a liquid developing apparatus including the tank holding the liquid with the floating member disposed in the tank.

13. The oscillating liquid level measuring apparatus as claimed in claim 1, in combination with a liquid developing apparatus including the tank holding the liquid with the floating member disposed in the tank.

14. The oscillating liquid level measuring apparatus as claimed in claim 2, in combination with a liquid developing apparatus including the tank holding the liquid with the floating member disposed in the tank.

* * * * *